Jan. 22, 1963   J. C. CONNOR   3,075,116
RADIATION DETECTOR
Filed Sept. 8, 1958

INVENTOR
John C. Connor
BY
Donald D. Smith
ATTORNEY

United States Patent Office 3,075,116
Patented Jan. 22, 1963

3,075,116
RADIATION DETECTOR
John C. Connor, Bethel Park, Pa., assignor to Westinghouse Electric Corporation, East Pittsburgh, Pa., a corporation of Pennsylvania
Filed Sept. 8, 1958, Ser. No. 759,454
9 Claims. (Cl. 313—93)

The present invention relates to electric discharge apparatus and has particular reference to a radiation detector sensitive to subatomic particles and to radiation emitted from atomic or subatomic particles.

Neutrons are one example of a subatomic particle which has zero electrical charge. Conventional radiation detectors, such as Geiger-Mueller counters and similar ionization chambers, therefore, are unaffected by the presence of neutronic radiation, for these detectors are actuated only by ionizing radiation including alpha, beta, or gamma rays. Neutrons can be detected by causing them to react with certain isotopes to yield charged particles, which in turn are detected, for instance, through the use of an ionization-type radiation counter. Thermal or thermalized neutrons, i.e., those having velocities in the neighborhood of 2,500 meters per second or less, are most efficient in inducing the aforementioned reactions. Fast neutrons, however, can be detected in this manner by first slowing or moderating them to thermal velocities by a mass of one of the well-known moderator materials containing hydrogen, beryllium or carbon.

The neutron sensitive ionization chamber of the invention is provided with a neutron sensitive material therein which is capable of ionizing a gas when a neutron impinges the chamber. In one example, the chamber may be arranged for operation with an internal gaseous filling of boron trifluoride ($BF_3$) and thus is capable of detecting so-called thermal or slow neutrons induced in a neutron-reactive gaseous filling of the chamber. In furtherance of this purpose, the $BF_3$ gas is enriched in one arrangement, to about 90% in the boron-10 isotope, although greater or lesser percent enrichment can be employed depending upon the sensitivity required and the availability of enriched boron. Boron-10 reacts with the impinging thermal neutrons in accordance with the following nuclear reaction:

$$B^{10}+n \rightarrow Li^7+\alpha$$

The resulting charged particles of alpha radiation induce ionization in the $BF_3$ gaseous filling which in turn can be utilized to induce an output in the external measuring circuitry associated with the chamber. This output current is proportional to the density of the thermal neutron flux impinging upon the ionization chamber. Obviously ionization of a gas in the chamber may be imparted by other methods such as by the use of a coating of a neutron sensitive material such as a coating of material containing boron-10 coupled with a gas capable of being ionized by the alpha radiation given off in the boron-10-neutron reaction. The gas is located in the ionization chamber and may comprise any well known ionizable gas such as argon.

Radiation detectors or neutron sensitive ionization chambers of the character described are frequently utilized to measure thermal neutron densities and it is desirable that for such service that they be highly sensitive. When employed for this purpose, the ionization chamber is disposed in the immediate vicinity of the source of neutrons and specific aspects of the present invention are concerned with an ionization chamber so disposed. Gamma rays, however, are produced usually in large quantities within or near a source of neutrons. This radiation also induces ionization within the gaseous filling of the chamber and distorts the indicative output thereof. The gamma radiation presents a peculiar difficulty in this connection because at times it tends to produce an ionizational current not ordinarily distinquishable from the signal resulting from the neutron-induced ionization.

An ionization chamber disposed to indicate thermal neutron densities often must be capable of operating satisfactorily over a wide temperature range existing in or near the source of neutrons. The chamber must also be capable of withstanding elevated temperatures and of withstanding shock and vibration frequently attendant with usage of the chamber. The components of the ionization chamber must be resistant to damage by neutronic irradiation and must not build up excessive induced activity. Otherwise, components having imparted thereto high induced activities would distort the indicative output of the chamber due to induced gamma radiation of the components and moreover, would make the chamber difficult to handle after such exposure.

The ionization chamber should have a saturation voltage of 800 volts or less in a thermal neutron flux of at least $10^{10}/cm.^2$ sec., in order to permit the $BF_3$ chamber to be utilized with conventional measuring circuitry.

It is accordingly an object of the present invention to provide a neutron-detector having a high sensitivity to thermal neutrons.

Another object of the invention is to provide a sensitive neutron detector having a minimum response to the confusing radiation produced by or in the vicinity of the detector such as the gamma radiation of the source of neutrons or the induced radiation imparted to components of the detector by the neutron flux.

Still another object of the invention is to provide a neutron detector capable of operating reliably and continuously at elevated temperature ranges and in areas of relatively dense neutron flux.

A further object of the invention is to provide a neutron detector capable of operating reliably when subject to severe shock and vibration.

Still another object of the invention is to provide an ionization collecting device of novel structure.

A still further object of the invention is to provide a neutron detector of novel structure which is characterized by ease of manufacture and simplicity of construction.

Another object of the invention is the provision of an ionization chamber in which the potential employed to collect the ionization, is not applied across any insulator of the chamber. Thus, any leakage current through the insulator will not form part of the output of the chamber.

These and other objects, features and advantages of the invention will be made apparent during the forthcoming description of an exemplary modification of the invention, with the description being taken in conjunction with the accompanying drawings wherein.

Figure 1:
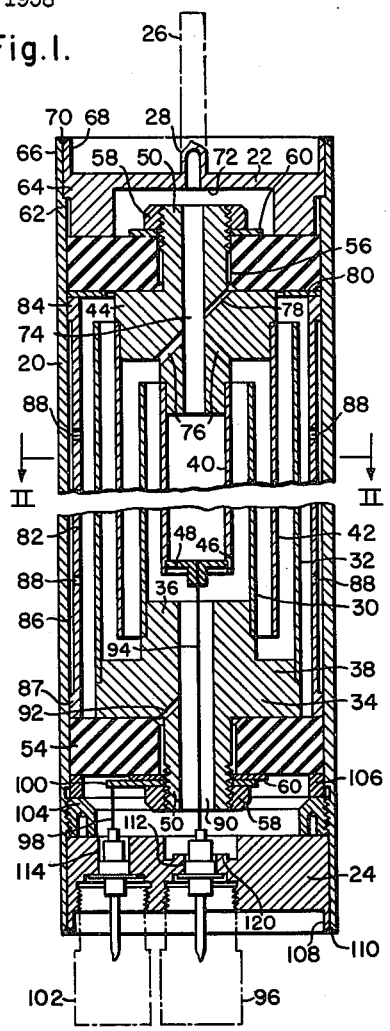
FIGURE 1 is a longitudinal sectional view of one form of neutron-detector arranged in accordance with the invention.
Figure 2:
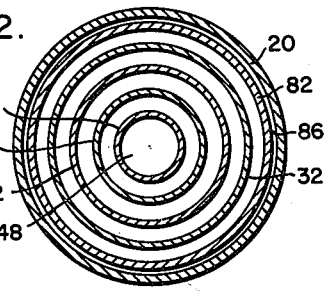
FIG. 2 is a cross-sectional view of the detector illustrated in FIG. 1 and taken along reference lines II—II thereof.

Referring now to FIGS. 1 and 2 of the drawings, the illustrative form of the invention shown therein comprises a housing 20, which is adapted, as described hereinafter, for hermetic sealing by means of end members 22 and 24 inserted respectively into the ends of the housing 20. The end member 22 is provided with an exhaust tubulation denoted by the dashed lines 26. After evacuation and refilling the housing 20 with the proper gaseous filling, the exhaust tubulation 26 is crimped and welded as indicated by the reference character 28 and cut off at a point inwardly of the outer end of the housing 20.

Mounted within the housing 20 are a pair of high voltage electrodes 30 and 32. The high voltage electrodes are arranged in the form of concentric cylinders and are attached in cantilever fashion to a common support 34, as by welding. To impart shock and vibration resistance to the ionization chamber, the common support 34 is provided with a stepped configuration with a portion of each step being reduced and inserted respectively into the adjacent ends of the high voltage electrodes 30 and 32, as denoted by reference characters 36 and 38, respectively.

A second pair of cylindrical electrodes 40 and 42 are employed as collector electrodes for the ionization chamber and as such are interlaced with the high voltage electrodes 30 and 32. The collector electrodes 40 and 42 likewise are concentric cylinders and are secured as by welding to a common support 44. To impart shock and vibration resistance to the ionization chamber, the support 44 likewise is furnished with a stepped configuration and is joined to the adjacent ends of the electrodes 40 and 42, as described previously in connection with the high voltage electrodes 30 and 32. The innermost electrode of the ionization chamber, which is the collector electrode 40, is closed at its free end 46 with an end cap 48 to which electrical contact is made in a manner presently described. Obviously more or less than two electrodes can be mounted on each support by varying the stepped configuration of the latter. The innermost electrode 40, moreover, can be made from a solid cylinder, if desired.

The term "cylinder" as employed herein is utilized in its broad geometric sense in which it signifies not only a circular cylinder but any surface formed by line moving parallel to itself over a planar curve. In accordance with the specific aspects of the invention, the cylinders herein are of circular cross-section. Moreover, it is not essential the side walls of the electrode be parallel, and to lend added support, the electrode can be tapered toward their free ends.

For the purpose of mounting the common supports 34 and 44 and the electrode members secured thereto respectively, each of the supports is provided with a threaded extension 50. Each threaded extension 50 is inserted through an adjacent electrical insulator 52 or 54, respectively. The insulators 52 and 54 are of annular configuration and are provided with central openings 56 to receive the threaded extensions 50, respectively. When thus mounted, the supports 44 and 34 are secured to the insulators 52 and 54, respectively, by means of mounting nuts 58 and washers 60.

The insulators 52 and 54 are made relatively thick in order to provide adequate electrical insulation between the high voltage support 34 and the housing 20 and to provide a rugged mounting for the electrodes of the ionization chamber. In this arrangement, the insulators 52 and 54 are of circular configuration and are fitted closely at their outer peripheries within the housing 20 in order to position the electrodes accurately and securely within the housing 20. As will be shown more clearly hereinafter, no electric potential is applied to the housing 20. Consequently, there is no leakage current across the high voltage insulator 54 which would be caused by the potential required to collect the ionization and which would appear as an input signal to the amplifier employed in conjunction with the chamber.

When assembling the ionization chamber, the end member 22 is first positioned within the adjacent end of the housing 20 by means of cooperating shoulders 62 and 64 formed respectively on the housing 20 and the end member 22. The end member 22 and the housing 20 in addition are furnished with a cooperating pair of relatively thin tubular extensions 66 and 68, respectively, which project outwardly of the shoulders 62 and 64. The end member 22 then is joined and hermetically sealed to the adjacent end of the housing 20 by welding the outer edges of the extension 66 and 68 together, as denoted by the reference numeral 70. Following this operation, the insulator 52, and support 44, and electrodes 40 and 42 secured thereto are positioned within the housing 20 in bearing contact with the end member 22. The inward surface of the end member 22 is provided with a dished configuration 72 to receive the threaded extension 50 and mounting nut 58 of the support 44. The support 44 is provided with a longitudinally extending passage 74 and with transverse passages 76 and 78, all of which communicate with the exhaust tubulation 28. Thus, the passages 74, 76 and 78 facilitate exhausting and refilling the spaces confined between the electrodes and between the insulator 52 and support extension 50, respectively.

A metallic shielding washer 80 is disposed adjacent the insulator 52 in order to reduce background noise in the external measuring circuitry. As is well known, electrical insulators whose surfaces are in close proximity to electrodes differing greatly in potential, are frequently noisy. The shielding washer 80, being of annular configuration, shields the outer portion of the insulator 52 from the potential of the adjacent free end of the high voltage electrode 32. The remainder of this insulator surface, of course, is shielded by the base portion of the conductive support 44. A similar shield is not necessary for the other insulator 54, since the latter is shielded from the free ends of the collector electrodes 40 and 42 by the larger metallic collector support 34.

A spacing cylinder 82 is then inserted into the housing 20 with one end 84 engaging the shielding washer 80. To facilitate insertion, the intermediate portion of the spacing cylinder 82 is furnished with an outside diameter somewhat less than the inside diameter of the housing 20 in order to provide a clearance 86. However, the thickened ends 84 and 87 of the spacing cylinder fit relatively closely within the housing 20 in order to space the cylinder 82 concentrically of the electrodes 30, 32, 40 and 42. In addition the spacing cylinder 82 spaces the electrodes longitudinally for a sufficient distance to prevent arcing. The spacing cylinder is supplied with a plurality of apertures 88 to facilitate evacuation and refilling the clearance 86 between the spacing cylinder in the housing 20.

When the aforementioned components are thus positioned, the high voltage electrode assembly including the insulator 54 is inserted into the housing 20 in position with the insulator 54 in bearing contact with the adjacent end 87 of the spacing cylinder 82. Means presently described are employed to space the end member 24 longitudinally and outwardly of the insulator 54 in order to provide the necessary clearance for the extension 50 of high voltage support 34 and the mounting nut 58. The support 34 is provided with a longitudinal extending passage 90 and a transverse passage 92 communicating therewith to facilitate evacuation and refilling of the clearances between the insulator 54 and the end member 24, and extension 50 of the support 34, respectively. The longitudinal passage 90 of the support 34 serves also as an opening through which the collector electrode lead 94 is brought for connection to the presently to be described terminal 96. The lead 94 is electrically insulated from the surrounding metallic support 34 by being spaced concentrically thereof.

Electrical contact to the high voltage electrodes 30 and 32 is provided by means of electrode lead 98 and the washer and lug arrangement 100 to which the lead 98 is secured. The washer-lug 100 is secured between the mounting nut 58 and washer 60 of the support 34 and thus electrical contact between a second terminal 102 and the high voltage electrodes 30 and 32 is made. The leads 94 and 98 in one example are iron and are crimped to the tubulated end cap 48 of the central electrode cylinder and tin-soldered to the washer-lug 100, respectively.

The insulating members 52 and 54 and the spacing cylinder 82 are maintained desirably in compression by means of an annular nut 104 which is threaded into the adjacent end of the housing 20. With this arrangement, the proper longitudinal spacing of the insulators 52 and 54, the supports 34 and 44 and associated electrodes is maintained under all conditions of use, and additionally, the resistance of the ionization chamber to shock and vibration is greatly improved. The annular nut 104 together with a spacing washer 106 provide the aforementioned clearance between the end member 24 and the insulator 54 for the high voltage support extension 50 and mounting nut 58.

After tightening the annular nut 104, to impart the desired compression to the components of the ionization chamber, the end member 24 is inserted into the adjacent end of the housing 20. When thus positioned, an outer extension 108 of the end member is joined and hermetically sealed to the associated end of the housing 20 by means of annular sealing weld 110. Following this operation, a portion of each of the terminals 96 and 102 are inserted into respective openings 112 and 114 of the end member 24 and then joined respectively to the electrode leads 94 and 98 as described subsequently.

In one arrangement of the invention, it is desired to fabricate the metallic electrode and structural components thereof from aluminum which has a neutron capture cross-section of only 0.23 barn. The isotope formed from the aluminum, moreover, through a (n, d) reaction is $Na^{24}$, having a half-life of only fifteen hours. In this arrangement then, the electrodes 30, 32, 40, and 42, the supports 34 and 44, the end members 22 and 24, the spacing cylinder 82, the housing 20 and the associated fasteners and other hardware are fabricated from aluminum with the result that induced activity in these components is very low even though the ionization chamber is employed in areas of extremely high neutron flux. Moreover, the radioisotope aluminum–28 produced by neutron capture in the aluminum structure material is extremely short-lived having a half life of 2.3 min. and decays with beta emission to the stable isotope silicon–28. The electrical insulators 44 and 54 are fabricated from a ceramic material, desirably aluminum oxide, which likewise is very stable in a nuclear sense since it is composed of aluminum having the aforementioned characteristics and of oxygen which has a much lower neutron capture cross section of less than 0.0002 barn. In an illustrative form of the invention, the housing 20 is a right circular cylinder having an outside diameter of about 3 inches and an overall length of about 12½ inches. The electrodes 40, 30, 42 and 32 are fabricated respectively from standard sizes of drawn 2S, 0.062 inch wall, aluminum tubing. The outside diameters of these electrodes are ¾, 1¼, 1¾, and 2¼ inches, respectively. The aforesaid diameters result in equal inter-electrode spacings of approximately ³⁄₁₆ inch.

Figure 3:
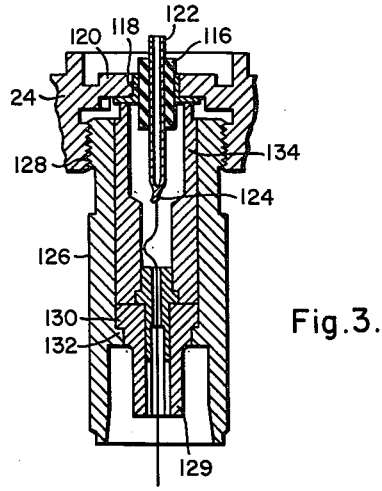
FIG. 3 is an enlarged sectional view of the connector and housing therefore illustrated in FIG. 1.

Referring now to FIG. 3 of the drawings, one form of the terminal and housing denoted by the reference characters 96 or 102 is illustrated therein. The terminal portion includes a ceramic insulator 116, for example fused aluminum oxide, which is sealed in a known manner to a tubular washer 118 fabricated from Kovar, an alloy comprising iron-nickel-cobalt, described and claimed in Patent 1,942,260. The Kovar washer 118 is mounted within a reduced portion of the opening 112 or 114 formed by a lip 120 disposed at the inward end of the opening. The washer 118 can be hermetically sealed to the adjacent portions of the lip 120 by welding (not shown) or alternatively by compression fitting in the manner described subsequently. Through the central portion of the ceramic insulator 116, a longitudinal passage is formed through which a closely fitting tube 122 is fitted. The tube 122 likewise is formed from Kovar and is hermetically sealed to the ceramic insulator 116. The electrode lead 94 or 98 is passed through the tube 122 and is sealed thereto at the outward end of the tube by crimping and welding the tube as denoted by reference numeral 124.

In one arrangement of the invention, the ceramic insulator 116 and associated components is held in place, and its tubular supporting washer 118 is sealed to the end cap 24 as aforesaid, by means of the terminal housing 126. The terminal housing 126 is threadedly secured to the tapped outer portion of the opening 112 or 114 as denoted by reference character 128. A central channel is formed in the housing 126 and a fitting 129 is positioned in the outward end of the channel by means of shoulders 130 and 132 formed respectively on the fitting and the terminal housing 126. By means of the fitting 128, the terminal housing 126 engages a tubular member 134 slidably mounted within the channel of the terminal housing and adapted to engage the washer 118. When the terminal housing 126 is threaded into the opening 112 or 114, pressure is applied by the housing 126 and its fitting 128 through the tubular member 134 to the washer 118 with the result that the latter is fitted and sealed to the lip 120 of the opening 112 or 114. The outward end of the housing 126 is threaded and with its central fitting 129 is adapted to receive the coupling (not shown) of a conventional coaxial cable, such as Amphenol type HN made by American Phenolic Company.

After the end members 22 and 24 have been welded as aforesaid to the housing 20 and the terminals secured and sealed to the end member 24, the ionization chamber is outgassed in this example at 150° C. for 16 hours before filling with $BF_3$. Subsequently, the ionization chamber is filled with $BF_3$ to a pressure of about 250 mm., in this example, and the exhaust tubulation 26 is sealed off as aforesaid. The total volume of an ionization chamber having the dimensions noted previously is slightly more than 500 cubic centimeters, for $BF_3$ filling purposes, of which the active inter-electrode collecting volumes total about 310 cc. Thus, neutron absorption is minimized in that portion of the gaseous filling not contributing to the output current of the ionization chamber.

Figure 4:
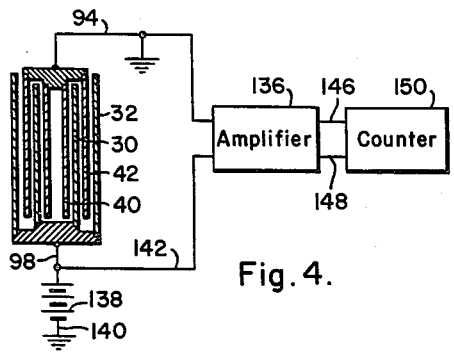
FIG. 4 is a schematic view showing one form of external measuring circuit adapted for use with the invention.

As better shown in FIG. 4 of the drawings, the collector electrodes 40 and 42 are coupled through the lead 94 to ground potential and to an input of suitable amplifying circuitry designated by the reference numeral 136. On the other hand, the high voltage electrodes 30 and 32 are connected through the lead 98 to the positive terminal of a power supply 138 preferably of the direct current type. The power supply 138 desirably has a high potential of the order of several hundred volts and its negative terminal 140 is grounded. The high voltage lead 98 and the positive terminal of the power supply 138 are connected through conductor 142 to the input of the amplifier 136. The amplifier 136 is arranged in a well-known manner to produce a signal which is proportioned to the output current of the ionization chamber.

The neutron sensitivity of the uncompensated chamber described herein was measured by direct comparison with a compensated ionization chamber of conventional design. An effort was made to obtain a uniform flux over the length of each chamber by placing them about two feet from a paraffin filled box measuring fifteen inches on a side and containing a 20 curie polonium-beryllium source. The output currents were measured with a vibrating reed electrometer. It was found that the thermal neutron sensitivity of the compensated and uncompensated ionization chambers were approximately equal or $4 \times 10^{-14}$ amp./nv., when the uncompensated chamber was filled with $BF_3$ to a pressure of 250 mm.-Hg.

Figure 5:
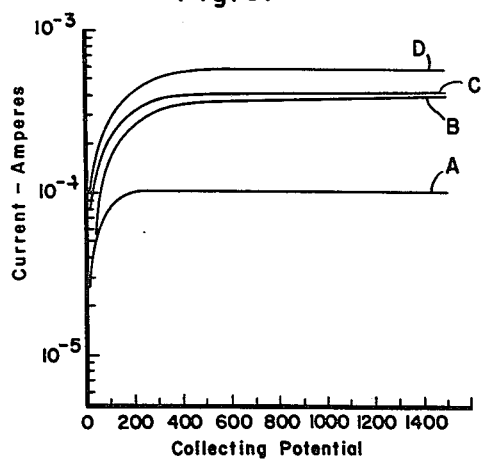
FIG. 5 is a graph illustrating the operation of the invention.

Referring now to FIG. 5 of the drawings, the curves of output current of the ionization chamber described herein are plotted as a function of applied voltage at differing neutron flux levels. The testing conditions associated with each of the curves A, B, C and D are summarized in the following table:

| Curve | Thermal, Flux, Neutrons cm.$^2$-sec. | Integrated Thermal Flux, Neutrons/cm.$^2$ |
|---|---|---|
| A | $2.5 \times 10^9$ | 0 |
| B | $1.0 \times 10^{10}$ | $4.0 \times 10^{16}$ |
| C | $1.0 \times 10^{10}$ | 0 |
| D | $1.5 \times 10^{10}$ | 0 |

Referring to curves A and D of FIG. 5, it will be seen that the saturation voltage increases with increase in neutron flux, at a flux of $10^{10}$/cm.$^2$-sec., for example, the ionization chamber of the invention saturates at about 400 volts as shown by curves B and C. Curve B of FIG. 5 was obtained after the ionization chamber had been subjected to a thermal neutron flux of $10^{10}$/cm.$^2$-sec. for about 1200 hours, which is equivalent to a time-integrated thermal neutron flux of $4.0 \times 10^{16}$/cm.$^2$ neutrons. At the conclusion of the 1200 hour exposure, curve B of FIG. 5 indicates that the saturated output current is slightly less than that obtained initially (curve C). The very slight increase in operating potential required for saturation after the 1200-hour exposure indicates that a useful life of the ionization chamber in excess of 3000 hours can be anticipated.

From the foregoing, it will be apparent that a novel and efficient ionization chamber has been disclosed herein. Because of the arrangement and manner of supporting its electrodes, the chamber is resistant to severe shock and vibration forces, and handling of the chamber is facilitated due to the fact that no potential is applied to the casing or housing 20 thereof. Because of its extremely high sensitivity to thermal neutrons, any signal produced by gamma or other background radiation is insignificant in comparison to the current arising from impinging neutrons and therefore gamma compensation is unnecessary.

The descriptive materials employed herein are presented for purposes of amplifying the invention and therefore are not to be interpreted as limitative thereof. Accordingly, numerous modifications of the invention will occur to those skilled in the art without departing from the spirit and scope of the invention.

Therefore, what is claimed as new is:

1. A detector including a housing capable of enclosing a gaseous medium, a pair of spaced insulators closely fitting and mounted within said housing, a pair of electrodes of substantial area secured respectively to said insulators and disposed in face-to-face relationship between which electrodes a potential is to be impressed, each of said electrodes comprising a support mounted on one of said insulators, a plurality of cylinders of progressively increasing cross-sectional area, at least one of said cylinders being secured to each electrode support, at least those cylinders other than the one of smallest area being hollow, said cylinders being secured to their respective supports so that the cylinders of said electrodes are interlaced respectively, said insulators being maintained in spaced relation by a spacing cylinder inserted therebetween and closely fitting in said housing.

2. A radiation detector including a housing capable of enclosing a gaseous medium, a pair of spaced insulators closely fitting and mounted within said housing, a pair of electrodes of substantial area secured respectively to said insulators and disposed in face-to-face relationship between which electrodes a potential is to be impressed, each of said electrodes comprising a support mounted on one of said insulators and a plurality of cylinders of progressively increasing cross-sectional area, at least the cylinders other than the one of smallest area being hollow, said cylinders being secured to their respective supports so that the cylinders of one electrode are interlaced with the cylinders of the other electrode, said insulators being maintained in spaced relation by a spacing cylinder inserted therebetween and closely fitting in said housing, said cylinders being of elongated form and each of said cylinders being suspended as a cantilever beam.

3. A detector including a housing capable of enclosing a gaseous medium, a pair of spaced insulators closely fitting and mounted within said housing, a pair of electrodes of substantial area secured respectively to said insulators and disposed in face-to-face relationship between which electrodes a potential is to be impressed, each of said electrodes comprising a support mounted on one of said insulators and a plurality of cylinders of progressively increasing cross-sectional area, at least the cylinders other than the one of smallest area being hollow, said cylinders being secured to their respetcive supports so that the cylinders of one electrode are interlaced with the cylinders of the other electrode, said cylinders being of elongated form and each of said cylinders being suspended as a cantilever beam, the insulator and support other than the ones to which said smallest cylinder is attached having an opening extending centrally therethrough, an electrode lead mounted in spaced relation in said opening and secured in electrical contact with said smallest cylinder to make electrical contact with the associated electrode, an electrical contacting means for the other of said electrodes.

4. A radiation detector including a housing capable of enclosing a gaseous medium, a pair of spaced insulators closely fitting and mounted within said housing, a pair of electrodes of substantial area secured respectively to said insulators and disposed in face-to-face relationship between which electrodes a potential is to be impressed, each of said electrodes comprising a support mounted on one of said insulators and a plurality of cylinders of progressively increasing cross-sectional area, at least the cylinders other than the one of smallest area being hollow, said cylinders being secured to their respective supports so that the cylinders of one electrode are interlaced with the cylinders of the other electrode, said insulators being maintained in spaced relation by a spacing cylinder inserted therebetween and closely fitting in said housing, said cylinders being of elongated form and each of cylinders being suspended as a cantilever beam, the insulator and support other than the ones to which said smallest cylinder is attached having an opening extending centrally therethrough, an electrode lead mounted in spaced relation in said opening and secured in electrical contact with said smallest cylinder to make electrical contact with the associated electrode, and electrical contacting means for the other of said electrodes.

5. A radiation detector including a housing capable of enclosing a gaseous medium, a pair of spaced insulators closely fitting and mounted within said housing, a pair of electrodes of substantial area secured respectively to said insulators and disposed in face-to-face relationship between which electrodes a potential is to be impressed, each of said electrodes comprising a support mounted on one of said insulators and a plurality of cylinders of progressively increasing cross-sectional area, at least the cylinders other than the one of smallest area being hollow, said cylinders being secured to their respective supports so that the cylinders of one electrode are interlaced with the cylinders of the other electrode, said insulators being maintained in spaced relation by a spacing cylinder inserted therebetween and closely fitting in said housing, said cylinders being of elongated form and each of said cylinders being suspended as a cantilever beam, the insulator and support other than the ones to which said smallest cylinder is attached having an opening extending centrally therethrough, an electrode lead mounted in spaced relation in said opening and secured in electrical contact with said smallest cylinder to make electrical contact with the associated electrode, an electrical contacting means for the other of said electrodes, and a gaseous filling contained within said housing, said filling being enriched substantially with the isotope $B^{10}$ and having a pressure of the order of 250 mm. of mercury.

6. A radiation detector including a housing capable of enclosing a gaseous medium, a pair of spaced insulators closely fitting and mounted within said housing, a pair of electrodes of substantial area secured respectively to said insulators and disposed in face-to-face relationship between which electrodes a potential is to be impressed, each of said electrodes comprising a support mounted on one of said insulators and a plurality of cylinders of progressively increasing cross-sectional area, at least the cylinders other than the one of smallest area being hollow, said cylinders being secured to their respective supports so that the cylinders of one electrode are interlaced with the cylinders of the other electrode, said insulators being maintained in spaced relation by a spacing cylinder inserted therebetween and closely fitting in said housing, and means for maintaining said insulators and said spacing cylinder under compression.

7. A detector comprising an elongated housing capable of enclosing a gaseous medium, a pair of longitudinally spaced insulators closely fitting and mounted within said housing, a pair of electrodes secured respectively to said insulators and disposed in face-to-face relationship between which electrodes a potential is to be impressed, said electrodes being disposed in said housing so that they longitudinally overlap, at least one of said electrodes being hollow, the other electrode having a portion thereof disposed within said one electrode and in spaced relation therewith, a pair of terminals for said electrodes disposed on said housing on the end thereof located adjacent said one electrode, means coupling one of said terminals to said one electrode, said one electrode and its associated insulator having an opening extending therethrough, and means extending through said opening for coupling said other electrode to the other of said terminals.

8. A detector comprising an elongated housing, a pair of longitudinally spaced insulators closely fitting and disposed within said housing, a pair of electrode supports disposed in said housing in face-to-face relationship and mounted on said insulators respectively, at least one cylindrical electrode secured to each of said supports and extending toward the other of said supports, at least one of said electrodes being disposed with its outer end located adjacent the insulator associated with the other electrode, a metallic shield located between said outer end and said last-mentioned insulator, said metallic shield being mounted in insulated relation with both of said electrodes, whereby noise in said one insulator is reduced.

9. A detector comprising an elongated housing, a pair of longitudinally spaced insulators closely fitting and disposed within said housing, a pair of electrode supports disposed in said housing in face-to-face relationship and mounted on said insulators respectively, at least one cylindrical electrode secured to each of said supports and extending toward the other of said supports, said electrodes being formed of differing cross-sectional areas, the larger of said electrodes being hollow with the other electrode being at least in part disposed therewithin, at least said hollow electrode having its outer end disposed adjacent one of said insulators, a metallic shield located between said outer end and said one insulator, said metallic shield being mounted in insulated relation with both of said electrodes, whereby noise in said one insulator is reduced.

References Cited in the file of this patent

UNITED STATES PATENTS

| | | |
|---|---|---|
| 2,012,038 | Eitel et al. | Aug. 20, 1935 |
| 2,226,729 | Litton | Dec. 31, 1940 |
| 2,440,167 | Broxon et al. | Apr. 20, 1948 |
| 2,735,944 | Greer | Feb. 21, 1956 |
| 2,736,816 | Morley | Feb. 28, 1956 |
| 2,809,313 | Baer et al. | Oct. 8, 1957 |